Jan. 24, 1939.  R. CHILTON  2,144,607
REDUCTION GEAR
Filed July 16, 1937
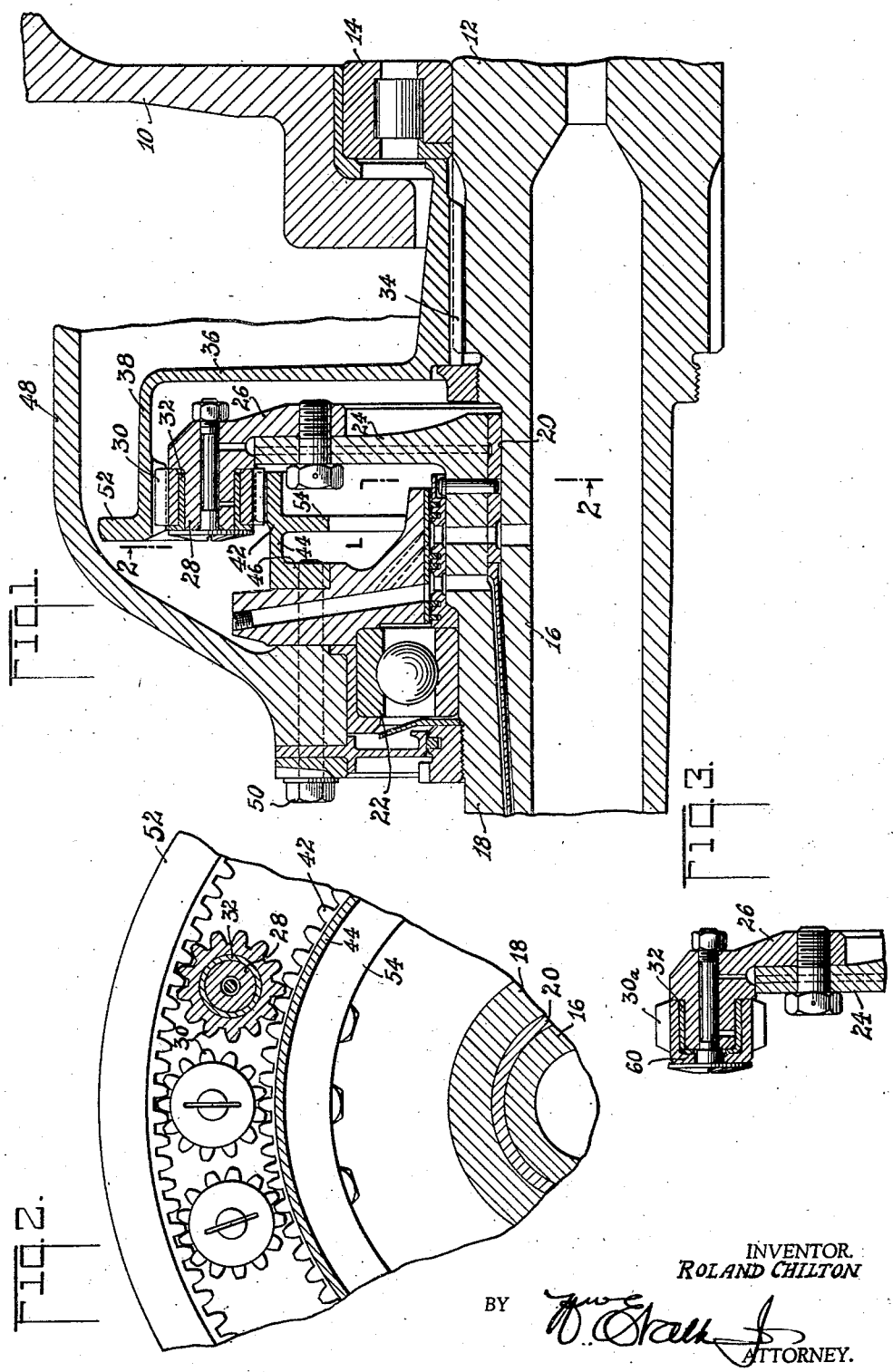
INVENTOR.
ROLAND CHILTON
BY
ATTORNEY.

Patented Jan. 24, 1939

2,144,607

UNITED STATES PATENT OFFICE 2,144,607

REDUCTION GEAR

Roland Chilton, Ridgewood, N. J., assignor, by mesne assignments, to Wright Aeronautical Corporation, Paterson, N. J., a corporation of New York Application July 16, 1937, Serial No. 153,906

13 Claims. (Cl. 74—305)

This invention relates to planetary reduction gears, the specific embodiment of the drawing illustrating a gear suitable for a large aircraft engine.

In such gears, all other proportions being equal, the power transmitted is proportional to the number of planet pinions that may be employed. As the gear ratio approaches 2:1 the pinions become smaller and, accordingly, a larger number may be used giving great advantages as to the specific capacity of a given gear when the optimum number of pinions is utilized, provided always that the load is evenly distributed over all of the pinions. This distribution is a question of the relationship between the inherent operating deflections in the structure as a whole, and the manufacturing tolerances in the parts. With modern production methods, tooth spacing errors are very minute and it is the accuracy of spacing in the pinion bearings that comprises the most important item of dimensional control as to load distribution between the pinions. At the same time, as to load distribution across the face of the teeth of any individual pinion, the deflections of the pinion supporting structure are the predominating factor.

In this type of gear, the pinion supports comprise cantilever journals extending integrally from a ring or back plate and experience has shown that, if the sun and ring gears are uniformly rigid, these deflections in the support concentrate the tooth load at the end of the pinion teeth next to the supported or integral end of the journal i. e., that end at which the power load is applied to the pinion bearing support member.

Fortunately, the ring gears may be far from rigid, having in fact substantial flexibility for radial distortion under load. Further, the pinions themselves in this type of gear are in the form of rings supported on bearings having clearance, whereby the bearing load reaction is at 90° around the circumference from the two instantaneously loaded teeth, giving considerable inherent compensating flexibility. The pinions should accordingly be made as thin beneath the tooth roots as is consistent with the necessary strength requirements.

Referring to the radial yield of gears, it has been found from experience in gears in general, that zones of high tooth load are apt to be concentrated opposite to any rib or web such as usually connects a light gear rim to a hub. In actual experiment, the zone of high tooth loading has followed the rib location when this has been moved, by change of design, from one end of the gear tooth width to the other without making any other changes in the organization.

According to this invention, the teeth of the gears are stiffened by suitable ribs or flanges at the end of the teeth remote from the power application side of the planetary carrier. In this way, the tendency of the load to concentrate at one end of the pinion, due to deflections in the supporting member, is compensated by ribs of the appropriate stiffness placed at the opposite ends of the gears.

The actual stiffness requirements of these ribs varies with each design and is determined in practice by making the first gear set with ribs of excessive depth and reducing them as required, after the gear has been run under full load conditions and inspected for high local tooth loads. If the stiffness of the ribs has in fact been exaggerated in the initial design, the high tooth loading will show up, on inspection, at the unsupported end of the pinions. Thus, the ribs can be reduced in size until even contact appears throughout the length of the pinion teeth.

Other objects and advantages will be obvious from, or will be pointed out, in the following description with reference to the drawing in which, Fig. 1 is a fragmentary longitudinal section through a gear incorporating the invention;

Fig. 2 is a fragmentary end section on the line 2—2 of Fig. 1; and

Fig. 3 is a fragmentary section showing a modification to the pinions.

The drawing discloses a gear similar in type to that of my co-pending application Serial No. 133,153, filed March 26, 1937.

A housing shown in fragmentary view at 10 supports a crankshaft 12 through a bearing 14, the crankshaft having an extension 16 on which there is supported a propeller shaft 18 on bushings, one of which is shown at 20.

The propeller shaft is supported on the usual thrust bearing 22 and is provided with a large integral flange 24, to which there is bolted a pinion supporting member or spider 26, having a large number of integral journals 28 extending leftwardly from the member 26 in Fig. 1. The journals 28 carry planet pinions 30 on floating bushings 32. The gear shown has a ratio of 16:9, the resultant pinion size affording room for 20 pinions as shown.

Secured to the crankshaft 12, by splines 34, is a bell or ring comprising a back plate 36 and a cylindrical ring 38. A sun gear 42 having a cylindrical portion 44 terminating in a bolting flange 46 is secured to a gear housing 48 by bolts 50.

The principal feature of this invention resides in the location of stiffening ribs or flanges 52 and 54 provided at the left hand end of the teeth of the ring gear 36 and of the sun gear 42 respectively. It is a further feature of the invention that the cylindrical portions 38—44 of the gears are relatively long and thin so that the back plates 36 and flange 46 of the respective gears are remote from the teeth, whereby they have little effect on the radial stiffness of the gears which is, accordingly, greatest at the ends of the teeth backed up by the stiffening ribs 52—54. This provision by itself would concentrate high bearing loads at this end of the teeth, but the cantilever deflections of the pinion journals 28 would by themselves concentrate the bearing load at the other end of the teeth and, by experiment on a prototype gear, the appropriate stiffness of the flanges 52—54 may be determined to balance these two tendencies with the result that the tooth load is evenly distributed across the tooth width, thereby utilizing the inevitable inherent flexibility of the parts to compensate against tooth misalignment under load by having one type of deflection subtract from the other, so that the parts deflect in sympathy.

At the same time, the inherent flexibility of the ring gears for radial yield is used cumulatively with the inherent ring type deflections of the pinions to compensate for such errors in pinion journal spacing as are within the tolerances by which the manufacture of these parts is controlled.

It is intended that the proportions of the rims 52—54 be exaggerated, particularly in the case of the sun gear 42 since its cylindrical element 44 springs from what would otherwise be its lightly loaded end, giving some inherent compensation even in the absence of the ring 54. In the case of the ring gear 36, in the absence of the stiffening rib 52, the connecting cylindrical portion 38 would cause the right hand end of the teeth to be most stiffly supported which adds to the deflection effect of the journals 28 in causing the concentration of tooth load observed at this end of the teeth in planetary gears not compensated as by the particular location by stiffening rib taught by this invention.

As indicated in Fig. 3 the stiffening flange of this invention may, if desired, be applied to the pinions in which case it will comprise the integral inwardly turned element 60. This embodiment may be less desirable than that previously described in that the rib will stiffen the pinion against ovalizing or ring deflection to a much greater extent than will ribs applied to the large ring gears and this pinion ovalizing comprises one of the major sources of inherent compensation against errors in pinion spacing.

The reduction gear here shown is for ratios close to 2:1 and incorporates a relatively large sun gear 42 and a large number (20) of small pinions 30 whereby the capacity of the gear is greatly increased without increasing the tooth loading intensity beyond conventional practice. Preferably, the pinions are on centers less than $2d$ apart wherein $d$ is a pinion diameter. Likewise, to accommodate a large number of pinions, the sun gear diameter should be not less than $4d$. With these minimum proportions, space is allowed for at least fifteen pinions. By increasing the sun gear diameter and by reducing $d$, 20 or more pinions may be incorporated with consequent greater gear capacity. In an actual design for an aircraft engine, a gear according to the principles taught, utilizing 20 pinions, weighed 97 lbs. less and had a much greater capacity than the previously used reduction gear.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A reduction gear including pinions mounted on cantilever journals on one side of a pinion carrier and thereby subject to angular deflections tending to concentrate the tooth loads towards the support end of the pinions, a pinion engaging gear, and a gear stiffening rim thereon disposed at the other end only of the engagement from the pinion support, the gear being relatively flexible at the end remote from the stiffening rim.

2. In a planetary gear, planet pinions, a planet carrier having cantilever journals on which said pinions are mounted, a driving member attached to said carrier on one side of said pinions whereby deflections are induced in said carrier tending to concentrate the load towards the driving member ends of the pinions, a gear engaging said pinions comprising a relatively thin ring, and a stiffening rib on said ring disposed only at the ends of the gear teeth remote from the carrier.

3. In combination, a relatively flexible ring gear, planetary pinions engaging said gear, a pinion carrier on which said pinions are cantilevered, means to drive said carrier located at one end only of said pinions whereby operating deflections in the carrier tend to concentrate the tooth loads at the carrier end of the pinion teeth, and means to correct said concentration comprising a stiffening flange on the ring gear disposed near the other ends of the teeth.

4. In a gearset including meshed gears comprising supports from which the toothed peripheries extend as cantilevers to one side of respective supports, whereby deflections under load tend to concentrate the tooth loads toward the end of the teeth nearest the supports, means for equalizing the load along the teeth comprising annular ribs on respective gears at the anti-support ends only of the teeth thereof.

5. In a planetary gearset comprising a bell gear, a sun gear and a planet carrier including cantilever journals having pinions thereon and meshing with said gears, means for distributing operating loads uniformly along the teeth of said pinions and gears comprising annular stiffening ribs on the ring and sun gears adjacent the ends thereof opposite from the planet carrier.

6. A reduction gear comprising a planet carrier having pinions journalled on cantilevers extending from the carrier, a ring gear and a sun gear each engaging said pinions, said cantilevers being yieldable under load to an attitude of tangential angulation of their axes whereby the loads tend to concentrate at the carrier end of the pinion teeth, and means to maintain uniform tooth contact between the pinions and gears comprising stiffening flanges on the ring and sun gears only near the end of the teeth opposite to the planet carrier, the ring and sun gears being thereby relatively free to yield radially under load at the tooth ends thereof nearest to the planet carrier to relieve tooth load concentration thereat.

7. In a reduction gear in combination with a carrier having a pinion journalled upon a cantilever extending therefrom and subject to angular deviation under load, a gear engaging said pinion, and means on said gear comprising a stiffening flange at the anti-carrier end thereof to control the radial yield along the tooth length thereof inversely to said deviation, to maintain uniform tooth contact of the gear and pinion teeth when under load.

8. In a reduction gear, in combination with a carrier having a pinion journalled upon a cantilever extending therefrom and subject to angular deviation under load, a gear engaging said pinion, and means on said gear to control the radial yield along the tooth length thereof inversely to said deviation, to maintain uniform tooth contact of the gear and pinion teeth when under load, said means comprising a gear rim having a stiff integral flange at its end farthest from the pinion carrier and being characterized by having relatively less radial stiffness at the other end nearest the pinion carrier.

9. In a gearset, in combination, a pinion and journal therefor relatively stiffly supported at one end and subject to angular deviation from the support under load whereby the tooth elements depart angularly from parallelism with the unloaded journal axis, and a mating gear characterized by having a variant radial stiffness along the tooth length, including a gear rim relatively yieldable at that end nearest the pinion support, the other stiffer end being substantially coplanar with that end of the pinion having the greatest deflection.

10. In a gear comprising a toothed rim integral with a radially resilient sleeve, the latter in turn being attached to a driving member, means for adjusting the radial stiffness of the toothed rim to a greater stiffness at the end thereof remote from the sleeve comprising a flange integral with said remote rim end only.

11. In a gearset including a pinion cantilevered from a support and mating with a gear extending from a sleeve, means for controlling the radial deflections of the sleeve gear along its tooth length inversely of the linear deflections along the tooth length of the pinion relative to its support, when under load, comprising a gear rim of greater thickness at that tooth end opposite to the pinion support than at its other end.

12. In combination, a gear having, normally, a substantially uniform radial stiffness along the tooth length, means to vary said stiffness from uniformity comprising a stiffening flange at one end of the gear, a pinion support at the other end of said gear, a pinion mating with the gear, and a member on which the pinion is journalled extending as a cantilever from said support.

13. In a gearset comprising a first gear having a stiff support at one end thereof, the other end of the gear being relatively free and subject to linear deflection under load, a mating gear meshed therewith, said gear being radially resilient toward the supported end of the first gear and having a rim at its opposite end to endow the gear with radial stiffness thereat, whereby linear deviation along the first gear is compensated by inverse radial deviation of the other gear with resultant full length contact between the teeth of the two gears.

ROLAND CHILTON.